United States Patent [19]

Suzuki et al.

[11] Patent Number: 4,860,340
[45] Date of Patent: Aug. 22, 1989

[54] DTMF SIGNAL DISCRIMINATING CIRCUIT

[75] Inventors: Yasuo Suzuki, Kamakura; Yukihiko Sasaki, Tokyo, both of Japan

[73] Assignee: Kabushiki Kaisha Toshiba, Kanagawa, Japan

[21] Appl. No.: 30,502

[22] Filed: Mar. 27, 1987

[30] Foreign Application Priority Data

Mar. 27, 1986 [JP] Japan .................. 61-69232
Mar. 27, 1986 [JP] Japan .................. 61-69233
Mar. 31, 1986 [JP] Japan .................. 61-73140

[51] Int. Cl.[4] .......................................... H04M 1/65
[52] U.S. Cl. ........................................ 379/74; 379/102
[58] Field of Search .................. 379/69, 70, 79, 82, 379/102, 283, 74–77

[56] References Cited

U.S. PATENT DOCUMENTS 3,904,826 9/1975 Murata et al. .
4,042,790 8/1977 Richards ........................... 379/283
4,460,806 7/1984 Canniff et al. .................... 379/283
4,514,593 4/1985 Hattori et al. ..................... 379/74
4,677,655 6/1987 Hashimoto ........................ 379/82
4,700,376 10/1987 Ohya et al. ....................... 379/74
4,720,846 1/1988 Hattori ............................. 379/79

Primary Examiner—Gerald L. Brigance
Assistant Examiner—Richard Hjerpe
Attorney, Agent, or Firm—Finnegan, Henderson, Farabow, Garrett & Dunner

[57] ABSTRACT

A DTMF signal discriminating circuit for a remote control apparatus, the DTMF signals corresponding to a plurality of predetermined operating modes of the apparatus, the apparatus including in OGM signal generating source responsive to an input signal from a remote source for indicating that the apparatus can receive DTMF signals. The DTMF signal discriminating circuit includes a signal coupling circuit for selectively supplying the OGM signal to the remote source and receiving the DTMF signals from the remote source, including a circuit for suppressing the OGM signal for substantially preventing operation of the apparatus in any of the predetermined operating modes in response to receipt of the OGM signal by the signal coupling circuit, a discrimination circuit for receiving the DTMF signals from the signal coupling circuit and a microcomputer responsive to the discrimination circuit for controlling operation of the apparatus in an operating mode corresponding to the received DTMF signals.

6 Claims, 11 Drawing Sheets

DTMF SIGNAL DISCRIMINATING CIRCUIT

BACKGROUND OF THE INVENTION

1. Field of the Invention

The present invention relates to a circuit for discriminating dual tone multiple frequency signals (referred as DTMF signals) and, more particularly to a circuit for discriminating the DTMF signals for a remote-controlled telephone apparatus.

2. Description of the Prior Art

Recently, there have been developed many varieties of remote-control systems using the telephone line. In some such systems, for example, an automatic telephone answering apparatus may perform many useful functions, such as sending prerecorded answering messages or outgoing messages signals (referred as OGM signals hereafter) to callers on remote telephone sets, and for recording an incoming message signal (referred as ICM signal hereafter) from callers. However, an automatic telephone answering apparatus may include additional functions responsive to the remote control operation through the telephone line. In such an automatic telephone answering apparatus, for example, an owner or a subscriber of the automatic telephone answering apparatus is able to operate his or her automatic telephone answering apparatus from outside through a remote telephone set, so as to play back recorded ICM signals from callers in his or her absence, or to record new OGM signals or renew the OGM signals. The remote control operation is usually performed by sending specific secret or personal codes, e.g., the DTMF signals through a remote telephone set. The DTMF signals correspond to each of twelve button codes of a standard telephone set, i.e., "0" to "9", "*" and "#".

In the remote control operation, first a subscriber calls his or her automatic telephone answering apparatus through a remote telephone set by dialing. The automatic telephone answering apparatus activates its own internal circuit in response to a calling signal from the remote telephone set. The subscriber then sends some DTMF signals to the automatic telephone answering apparatus by operating buttons of the remote telephone set. The automatic telephone answering apparatus is provided with a processor, such as a microcomputer, for controlling the remote control operations and other necessary controls in response to the received DTMF signals. The microcomputer identifies or discriminates the DTMF signals and then performs a prescribed control corresponding to the received DTMF signals.

Normally each DTMF signal comprises a specific combination of two signals, one selected from a group of four low frequency signals and the other from a group of three high frequency signals. The four low frequency signals typically are comprised of a 697 kHz signal, a 770 kHz signal, an 852 kHz signal and a 941 kHz signal, while the three high frequency signals are comprised of a 1,209 kHz signal, a 1,336 kHz signal and a 1,477 kHz signal. The twelve telephone buttons "0" to "9", "*" and "#" correspond to the four low frequency signals and the three high frequency signals in a matrix circuit, as shown in FIG. 1. Thus, when the telephone button "1", for example, is operated, a DTMF signal with a combination of the 697 kHz low frequency signal and the 1,209 kHz high frequency signal is transmitted from the telephone set. The high frequency signal and the low frequency signal in the same DTMF signal should be generated within a time difference of five (5) msec. (millisecond) or less from each other when a prescribed button is operated. Also, the high frequency signal should have a sound level not more than three (3) dB lower than the sound level of the low frequency signal in the same DTMF signal.

As shown in FIG. 2, such a conventional automatic telephone answering apparatus is equipped with a line coupling transformer 20, a bell signal detection circuit 22, a line switch circuit 24, an outgoing message signal source (referred to as OGM source hereafter) 26 such as a magnetic tape apparatus, an incoming message recorder (referred to as ICM recorder hereafter) 28 such as a magnetic tape apparatus and a circuit 30 for discriminating the DTMF signals. In FIG. 2, the conventional DTMF signal discriminating circuit 30 comprises a selective signal coupling circuit 32, a frequency signal extracting circuit 34 and a microcomputer 36. The line coupling transformer 20 is coupled to a telephone line TL through the line switch circuit 24. The line switch circuit 24 has a control terminal 24a connected to the microcomputer 36. The bell signal detection circuit 22 is coupled between a primary winding 20a of the line coupling transformer 20 and the microcomputer 36 for detecting a bell signal through the telephone line TL. The microcomputer 36 activates the line switch circuit 24 in response to a detection signal from the bell signal detection circuit 22. The OGM source 26 and the ICM recorder 28 are arranged so that the OGM source 26 generates an OGM signal and the ICM recorder 28 records an ICM signal under the control of the microcomputer 36 in a prescribed automatic telephone answering mode.

In the DTMF signal discriminating circuit 30, the selective signal coupling circuit 32 has an input terminal 32a, an input/output terminal 32b and an output terminal 32c. The input terminal 32a is provided for receiving the OGM signal applied from the OGM source 26. The input/output terminal 32b receives the ICM signal applied from a remote telephone set through the telephone line TL and the line coupling transformer 20. The output terminal 32c is connected to the microcomputer 36 through the frequency signal extracting circuit 34. The frequency signal extracting circuit 34 is comprised of first to seventh band pass filters (referred to as BPF circuits hereafter) 38a, 38b, 38c, ... 38g, and also first to seventh phase locked loop circuits (referred to as PLL circuits hereafter) 40a, 40b, ... 40g. The first to seventh BPF circuits 38a, 38b, 38c, ... 38g are connected in parallel between the selective signal coupling circuit 32 and the microcomputer 36. That is, input terminals of the first to seventh BPF circuits 38a, 38b, 38c, ... 38g are connected in common to the output terminal 32c of the selective signal coupling circuit 32, while output terminals of the first to seventh BPF circuits 38a, 38b, 38c, ... 38g are connected in parallel to first to seventh input terminals 36-Ia, 36-Ib, ... 36-Ig of the microcomputer 36. The first to seventh PLL circuits 40a, 40b, 40c ... 40g are connected in parallel between the first to seventh BPF circuits 38a, 38b, 38c, ... 38g and the input terminals 36-Ia, 36-Ib, 36-Ic, ... 36-Ig of the microcomputer 36, respectively. The first to seventh BPF circuits 38a, 38b, 38c, ... 38g and the first to seventh PLL circuits 40a, 40b, 40c ... 40g are responsive to the frequency signals, i.e., the signals of 697 kHz, 770 kHz, 852 kHz, 941 kHz, 1,209 kHz, 1,336 kHz and 1,477 kHz, respectively.

The operation of the conventional automatic telephone answering apparatus shown in FIG. 2, in particular, the the DTMF signal discriminating operation of the DTMF signal discriminating circuit 30 now will be described. When a subscriber calls his or her automatic telephone answering apparatus from a remote telephone set (not shown), the bell signal detection circuit 22 detects bell signals transmitted from the remote telephone set and applies a detection signal to the microcomputer 36. The microcomputer 36 then activates the line switch circuit 24 in response to the detection signal so that a communication channel is established between the remote telephone set and the automatic telephone answering apparatus. The microcomputer 36 also drives the OGM source 26 so that the OGM source 26 transmits an OGM signal prerecorded therein to the selective signal coupling circuit 32. The selective signal coupling circuit 32 is arranged so that the OGM signal applied to the input terminal 32a is selectively transmitted to the input/output terminal 32b. An ICM signal applied to the input/output terminal 32b through the line coupling transformer 20 is selectively transmitted to the output terminal 32c. Therefore, the OGM signal is transmitted to the input/output terminal 32b of the selective signal coupling circuit 32, but is prevented from being transmitted to the output terminal 32c. The audible OGM signal on the input/output terminal 32b of the selective signal coupling circuit 32 is transmitted to the remote telephone set through the line coupling transformer 20. Thus, the subscriber on the remote telephone set recognizes that the automatic telephone answering apparatus is ready to respond for remote control operations from the remote telephone set.

Referring now to FIG. 3, the operation of the prior art DTMF signal discriminating circuit 30 will be described, for example, in discriminating two DTMF signals corresponding to the button codes "1" and "3". When the subscriber sequentially operates the telephone buttons "1" and "3" for carrying out a prescribed remote control operation, first, the DTMF signal corresponding to the telephone button "1" (referred as DTMF signal "1" hereafter), is generated from the telephone set. This signal is shown by a waveform a1 in the graph A of FIG. 3, and is composed of the 697 kHz low frequency signal and the 1,209 kHz high frequency signal. Next, the other DTMF signal corresponding to the telephone button "3" (referred as DTMF signal "3" hereafter), is generated from the telephone set. This signal is shown by a waveform a2 in the graph A of FIG. 3, and is composed of the 697 kHz low frequency signal and the 1,477 kHz high frequency signal. The DTMF signals "1" and "3" are applied to the input/output terminal 32b of the selective signal coupling circuit 32 through the telephone line TL and the line coupling transformer 20. In the selective signal coupling circuit 32, the DTMF signals "1" and "3" are selectively transmitted to the input/output terminal 32b, as described above. The DTMF signals "1" and "3" are then applied to the frequency signal extracting circuit 34. In the frequency signal extracting circuit 34, the 697 kHz signal component in each of the DTMF signals "1" and "3" are extracted by the BPF circuit 38a sequentially at the times T1 and T2 corresponding to the times when the caller activates telephone buttons "1" and "3". The 1,209 kHz signal component of the DTMF signal "1" is extracted by the BPF circuit 38e at the time T1. Further the 1,477 kHz signal component of the DTMF signal "3" is extracted by the BPF circuit 38g at the time T2.

The 697 kHz signal, the 1,209 kHz signal and the 1,447 kHz signal are applied to the PLL circuits 40a, 40e and 40g, respectively. The first to seventh PLL circuits 40a, 40b, 40c . . . 40g are arranged so that their outputs have a high (H) level when they are supplied with no extracted signals from their corresponding first to seventh BPF circuits 38a, 38b, 38c, . . . 38g, while their outputs have a low (L) level when they are supplied with extracted signals from their corresponding first to seventh BPF circuits 38a, 38b, 38c, . . . 38g. Thus, the output of the PLL circuit 40a has the L level twice, as shown by L level signals b1 and b2 in the graph B of FIG. 3, corresponding to receipt of the 697 kHz signal and the 1,209 kHz signal. The output of the PLL circuit 40e has the L level once, as shown by L level signal c1 in the graph C of FIG. 3, corresponding to receipt of the 1,209 kHz signal. The output of the PLL circuit 40g also has the L level once, as shown by L level signal d2 in the graph D of FIG. 3, corresponding to receipt of the 1,477 kHz signal.

The respective outputs b1, b2, c1 and d2 of the PLL circuits 40a, 40e and 40g are applied to the input terminals 36-Ia, 36-Ie and 36-Ig of the microcomputer 36. The microcomputer 36 then discriminates the DTMF signal "1" by detecting that the output b1 of the PLL circuit 40a and the output c1 of the PLL circuit 40e both exhibit the L level at the time T1. Also the microcomputer 36 discriminates the DTMF signal "3" by detecting that the output b2 of the PLL circuit 40a and the output d2 of the PLL circuit 40g both exhibit the L level at the time T2. The periods of the DTMF signals "1" and "3", i.e., the L level periods of the outputs b1, b2, c1 and d2 of the PLL circuits 40a, 40e and 40g must be more than about thirty five (35) msec. so that the microcomputer 36 is capable of discriminating them.

This conventional DTMF signal discriminating circuit has some drawbacks. The conventional circuit may easily carry out some undesired remote control operation, without responding to the DTMF signals. In other words, the conventional DTMF signal discriminating circuit is easily influenced by undesired signals other than the DTMF signals. In an automatic telephone answering apparatus responsive to remote control, the OGM source 26 typically is used for providing callers with some subscriber's message, i.e., the OGM signal. The OGM signal is, of course, an audio frequency band signal, and the OGM signal applied to the selective signal coupling circuit 32 often leaks out to the output terminal 32c. When the leaking OGM signal includes frequency components corresponding to the specific frequency signal components of the DTMF signals, the OGM signal may be extracted by the frequency signal extracting circuit 34. As a result, the microcomputer 36 may wrongly carry out some remote control operation.

In the conventional circuit, it also is difficult to discriminate the frequency signals from the other frequency signals in the same frequency group. This is because the frequency signals in the same low or high frequency group are close in frequency to each other. Therefore, the first to seventh BPF circuits 38a, 38b, 38c, . . . 38g can easily extract the other frequency signals in the same low or high frequency group by mistake, if the first to seventh BPF circuits 38a, 38b, 38b, . . . 38g have fairly sharp frequency selection characteristics. For example, FIG. 4 shows a frequency selection characteristic diagram for both the BPF circuits 38e and 38g. In FIG. 4, the characteristics are taken from the BPF circuits 38e and 38g with their selectivities Q being set to ten (10). As shown in FIG. 4, the 1,209 kHz signal and the 1,477 kHz signal extracted by the BPF circuits 38e and 38g overlap with one another over a relatively wide frequency range. The difference in the nonoverlapped portion between these frequency ranges is not more than three (3) dB. Therefore, the microcomputer 36 may not properly discriminate between these signals.

SUMMARY OF THE INVENTION

Accordingly, an object of the present invention is to accurately discriminate DTMF signals in a remote controlled telephone apparatus.

Another object of the present invention is to eliminate incorrect remote control operation of a telephone apparatus due to undesired signals other than the DTMF signals.

Additional objects and advantages will be obvious from the description which follows, or may be learned by practice of the invention.

In order to achieve the above objects, the DTMF signal discriminating circuit for a remote control apparatus, in which the DTMF signals correspond to a plurality of predetermined operating modes of the apparatus, and in which the apparatus includes OGM signal generating source responsive to an input signal from a remote source for indicating that the apparatus can receive DTMF signals, includes a signal coupling circuit for selectively supplying the OGM signal to the remote source and receiving the DTMF signals from the remote source, including a circuit for suppressing the OGM signal for substantially preventing operation of the apparatus in any of the predetermined operating modes in response to receipt of the OGM signal by the signal coupling circuit, a discrimination circuit for receiving the DTMF signals from the signal coupling circuit and a microcomputer responsive to the discrimination circuit for controlling operation of the apparatus in an operating mode corresponding to the received DTMF signals.

DESCRIPTION OF THE PREFERRED EMBODIMENTS

Figure 1:
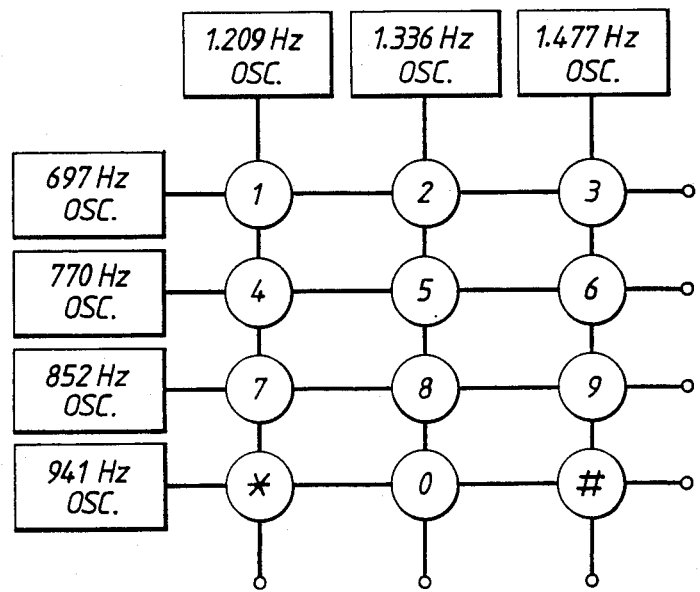
FIG. 1 is diagram showing a typical arrangement of telephone buttons in relation to DTMF signal components.
Figure 2:
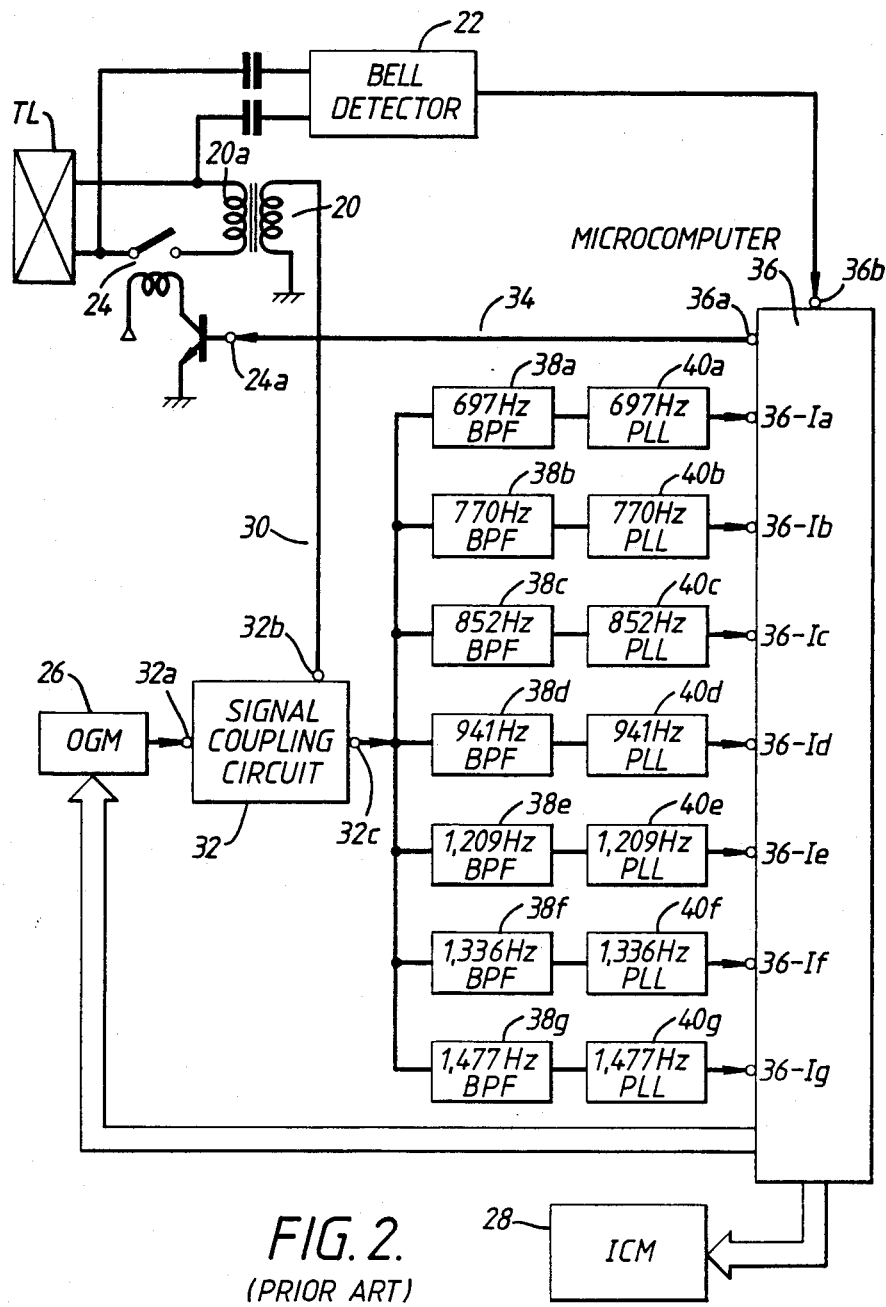
FIG. 2 is a block diagram showing an automatic telephone answering apparatus which is equipped with a conventional DTMF signal discriminating circuit.
Figure 3:
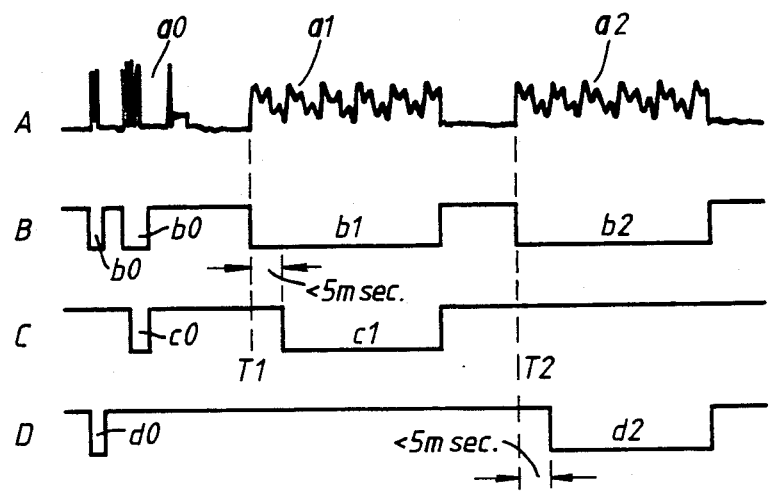
FIG. 3 is a timing diagram for illustrating operation of the conventional DTMF signal discriminating circuit shown in FIG. 2.
Figure 4:
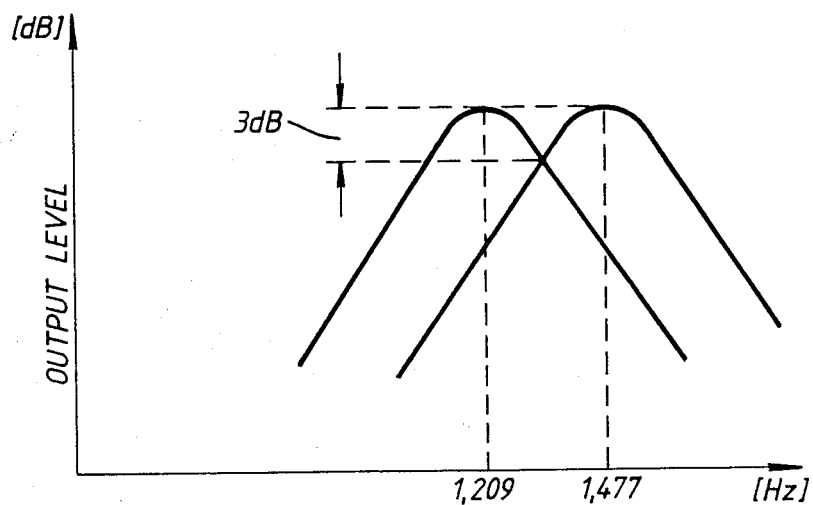
FIG. 4 is a frequency selection characteristic diagram for both the BPF circuits 38e and 38g in FIG. 2.

The present invention will now be described in detail with reference to the accompanying drawings, namely, FIGS. 5 through 12. Throughout the drawings, like reference numerals and letters are used to designate elements like or equivalent to those used in FIG. 2 (Prior Art Apparatus) for the sake of simplicity of explanation.

Figure 5:
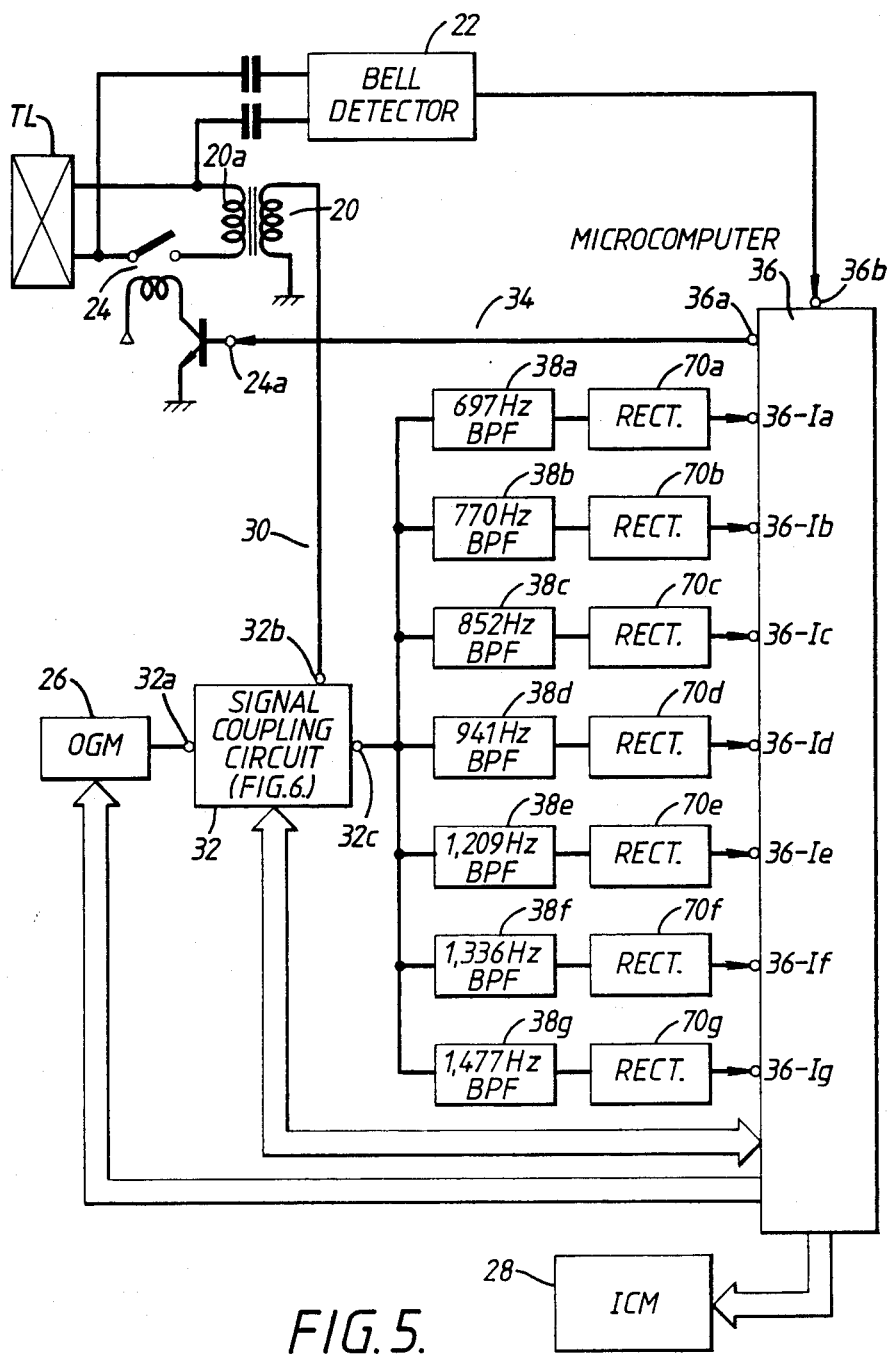
FIG. 5 is a block diagram showing an automatic telephone answering apparatus which is equipped with a first embodiment of the DTMF signal discriminating circuit according to the present invention.
Figure 6:
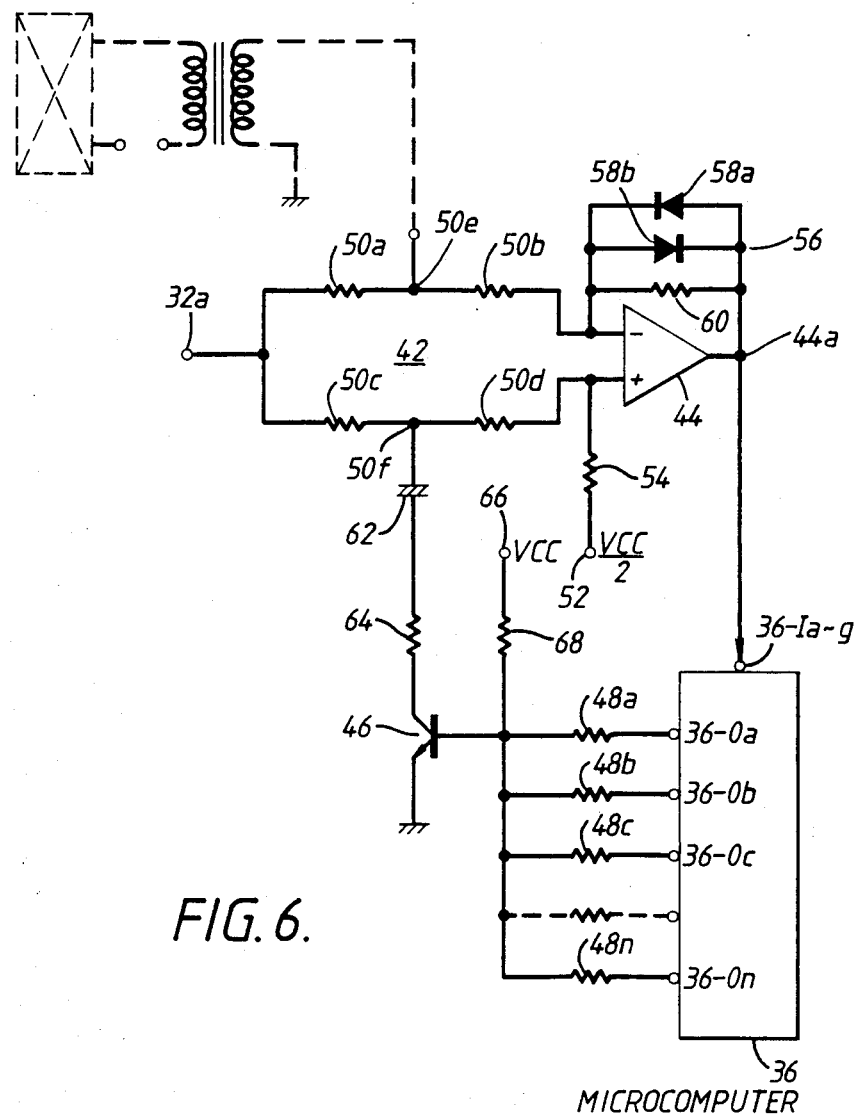
FIG. 6 is a circuit diagram showing the detail of the signal coupling circuit 32 in FIG. 5.

Referring now to FIGS. 5 and 6, an automatic telephone answering apparatus, which is equipped with a first embodiment of the DTMF signal discriminating circuit according to the present invention, will be described. In FIG. 5, the automatic telephone answering apparatus is comprised of a line coupling transformer 20, a bell signal detection circuit 22, a line switch circuit 24, an OGM source 26 such as a magnetic tape apparatus, an ICM recorder 28 such as a magnetic tape recorder and a DTMF signal discriminating circuit 30 for discriminating the DTMF signals. The DTMF signal discriminating circuit 30 comprises a selective signal coupling circuit 32, a frequency signal extracting circuit 34 and a microcomputer 36. The line coupling transformer 20 is coupled to a telephone line TL through the line switch circuit 24. The line switch circuit 24 has a control terminal 24a connected to a control signal output terminal of the microcomputer 36. The bell signal detection circuit 22 is coupled between the primary winding 20a of the line coupling transformer 20 and a bell detection signal input terminal 36b of the microcomputer 36 for detecting a bell signal applied through the telephone line TL. The DTMF signal discriminating circuit 30 activates the line switch circuit 24 in response to a detection signal from the bell signal detection circuit 22. The OGM source 26 and the ICM recorder 28 are arranged so that the OGM source 26 generates an OGM signal and the ICM recorder 28 records an ICM signal supplied through the telephone line TL and the line coupling transformer 20 under the control of the microcomputer 36 in a prescribed automatic telephone answering mode.

In the DTMF signal discriminating circuit 30, the selective signal coupling circuit 32 has an input terminal 32a, an input/output terminal 32b and an output terminal 32c. The input terminal 32a is provided for receiving the OGM signal applied from the OGM source 26. The input/output terminal 32b is provided for outputting the OGM signal and for receiving the ICM signal applied from a remote telephone set through the telephone line TL and the line coupling transformer 20. The output terminal 32c is connected to the microcomputer 36 through the frequency signal extracting circuit 34.

Referring now to FIG. 6, a circuit arrangement of the selective signal coupling circuit 32 will be described in detail. As shown in FIG. 6, the selective signal coupling circuit 32 mainly is comprised of a balanced resistance bridge circuit 42, an operational amplifier 44, a transistor 46 and a plurality of base resistors 48a, 48b, . . . 48n. The balanced resistance bridge circuit 42 includes four resistors 50a, 50b, 50c and 50d. The resistors 50a and 50b are connected in series between the input terminal 32a and an inverted input terminal (−) of the operational amplifier 44. A connection node 50e between the resistors 50a and 50b correspond to the input/output terminal 32b. The resistors 50c and 50d are connected in series between the input terminal 32a and a non-inverted input terminal (+) of the operational amplifier 44. The non-inverted input terminal (+) of the operational amplifier 44 is connected to a first power supply terminal 52 with a voltage of Vcc/2 through a resistor 54, while the inverted input terminal (−) of the operational amplifier 44 is connected to the output terminal 44a of the operational amplifier 44 through a feedback circuit 56. The feedback circuit 56 is comprised of two diodes 58a and 58b and a resistor 60 which are connected in parallel with each other. The diodes 58a and 58b are connected in opposite directions with each other. A connection node 50f between the resistors 50c and 50d is connected to the collector terminal of the transistor 46 through a capacitor 62 and a collector resistor 64. The transistor 46 has its emitter terminal connected to a reference potential source G and its base terminal connected to a second power supply terminal 66 with a voltage Vcc through a base bias resistor 68. The base terminal of the transistor 46 is further connected to the microcomputer 36 through the plurality of base resistors 48a, 48b, . . . 48n. That is, each of the base resistors 48a, 48b, . . . 48n is connected at one end thereof to the base terminal of the transistor 46, and at the other end thereof in parallel to output terminals 36-Oa, 36-Ob, 36-Oc, . . . and 36-On of the microcomputer 36. An output terminal 44a of the operational amplifier 44 is connected to the microcomputer 36, and to the frequency signal extracting circuit 34 (see FIG. 5) as the output terminal 32c.

The operation of the automatic telephone answering apparatus shown in FIG. 5, in particular the operation of the selective signal coupling circuit 32 shown in FIG. 6 now will be described. When a subscriber calls his or her automatic telephone answering apparatus from a remote telephone set (not shown) by dialing, the bell signal detection circuit 22 detects bell signals transmitting from the remote telephone set and applies a detection signal to the bell detection signal input terminal 36b of the microcomputer 36. The microcomputer 36 applies a prescribed control signal to the control terminal 24a of the line switch circuit 24 through the control signal output terminal 36a so as to activate the line switch circuit 24 in response to the detection signal. As a result, a communication channel is established between the remote telephone set and the automatic telephone answering apparatus. The microcomputr 36 also drives the OGM source 26 so that the OGM source 26 transmits the OGM signal prerecorded therein to the selective signal coupling circuit 32.

The OGM signal applied to the input terminal 32a is selectively transmitted to the input/output terminal 32b through the resistor 50a. The OGM signal obtained to the input/output terminal 32b then is transmitted to the subscriber on the remote telephone set through the line coupling transformer 20 and the telephone line TL. On the other hand, the OGM signal from the OGM source 26 is supplied in parallel to the inverted input terminal (−) and the non-inverted input terminal (+) of the operational amplifier 44 through the balanced resistance bridge circuit 42. When input impedances on the inverted input terminal (−) and the non-inverted input terminal (+) are in balance with each other, the OGM signals on the inverted input terminal (−) and the non-inverted input terminal (+) offset each other in the operational amplifier 44. However, the balancing state of the balanced resistance bridge circuit 42 is broken according to the impedance of the telephone line TL. That is, the impedance of the telephone line TL varies in accordance with line paths between the automatic telephone answering apparatus and telephone sets. Therefore, some amount of the OGM signal leaks to the output terminal 44a of the operational amplifier 44. The leaked OGM signal is led to the microcomputer 36 and its level is detected therein. The microcomputer 36 then controls activation or deactivation of the output terminals 36-Oa, 36-Ob, 36-Oc, . . . 36-On in response to the level of the OGM signal. For example, the microcomputer 36 changes one or more outputs of the output terminals 36-Oa, 36-Ob, 36-Oc, . . . 36-On to the H level, i.e., the activation state, but leaves the other outputs in the L level, i.e., the deactivation state. Thus, some of the base resistors 48a, 48b, 48c, . . . 48n are activated, but others of the base resistors 48a, 48b, 48c, . . . 48n remain deactivated so that the base impedance of the transistor 46 is controlled in accordance with the level of the leaked OGM signal. The conductivity of the transistor 46 varies according to the base impedance. As a result, the total impedance of the circuit between the resistor 50f and the ground potential source G varies to compensate for the line impedance between the node 50e (i.e., the input/output terminal 32b) and the remote telephone set. Thus, the OGM signal is selectively transmitted to the caller on the remote telephone set, but leaking of the OGM signal to the output terminal 44a of the operational amplifier 44, i.e., the output terminal 32c of the selective signal coupling circuit 32 is reduced. Upon receipt of the audible OGM signal, the subscriber on the remote telephone set recognizes that the automatic telephone answering apparatus is ready to respond for remote control operations from the remote telephone set. The subscriber then is able to apply a prescribed DTMF signal to the automatic telephone answering apparatus by using the remote telephone set. The DTMF signal discriminating circuit 30 of the automatic telephone answering apparatus accurately discriminates the DTMF signal without interference from leaking OGM signals which can cause incorrect operation.

Figure 7:
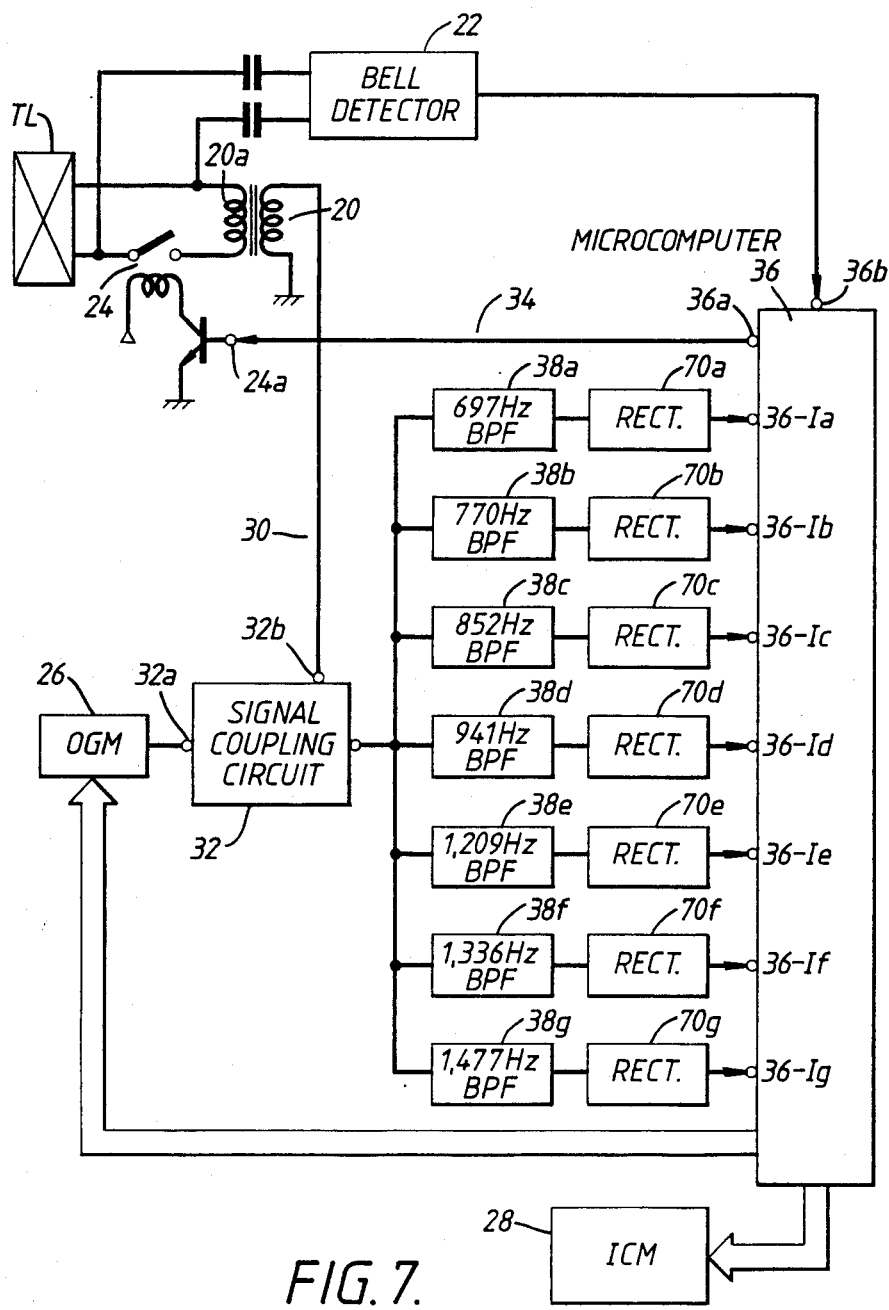
FIG. 7 is a block diagram showing an automatic telephone answering apparatus which is equipped with a second embodiment of the DTMF signal discriminating circuit according to the present invention.

Referring now to FIG. 7, an automatic telephone answering apparatus, which is equipped with a second embodiment of the DTMF signal discriminating circuit according to the present invention, now will be described. In FIG. 7, the automatic telephone answering apparatus is comprised of a line coupling transformer 20, a bell signal detection circuit 22, a line switch circuit 24, an OGM source 26 such as a magnetic tape apparatus, an ICM recorder 28 such as a magnetic tape recorder and a DTMF signal discriminating circuit 30 for discriminating the DTMF signals, similar to the first embodiment shown in FIG. 5. The DTMF signal discriminating circuit 30 comprises a selective signal coupling circuit 32, a frequency signal extracting circuit 34 and a microcomputer 36. The line coupling transformer 20 is coupled to a telephone line TL through the line switch circuit 24. The line switch circuit 24 has a control terminal 24a connected to a control signal output terminal 36a of the microcomputer 36. The bell signal detection circuit 12 is coupled between the primary winding line 20a of the line coupling transformer 20 and a bell signal detection input terminal 36b of the microcomputer 36 for detecting a bell signal applied through the telephone line TL. The DTMF signal discriminating circuit 30 activates the line switch circuit 24 in response to a detection signal from the bell signal detection circuit 22. The OGM source 26 and the ICM recorder 28 are arranged so that the OGM source 26 generates an OGM signal and the ICM recorder 28 records an ICM signal applied through the telephone line TL and the line coupling transformer 20 under the control of the microcomputer 36 in a prescribed automatic telephone answering mode.

The frequency signal extracting circuit 34 is comprised of first to seventh BPF circuits 38a, 38b, 38c, ... 38g and also first to seventh rectifier circuits 70a, 70b, 70c, ... 70g. The first to seventh BPF circuits 38a, 38b, 38c, ... 38g are connected in parallel between the selective signal coupling circuit 32 and the microcomputer 36. That is, the input terminals of the first to seventh BPF circuits 38a, 38b, 38c, ... 38g are connected in common to the output terminal 32c of the selective signal coupling circuit 32, while the output terminals of the first to seventh BPF circuits 38a, 38b, 38c, ... 38g are connected in parallel to first to seventh input terminals 36-Ia, 36-Ib, 36-Ic, ... 36-Ig of the microcomputer 36. The first to seventh rectifier circuits 70a, 70b, 70c, ... 70g are connected in parallel between the first to seventh BPF circuits 38a, 38b, 38c, ... 38g and the input terminals 36-Ia, 36-Ib, 36-Ic, ... 36-Ig of the microcomputer 36, respectively. The first to seventh BPF circuits 38a, 38b, 38c, ... 38g and the rectifier circuits 70a, 70b, 70c, ... 70g are responsive to the frequency signals, i.e., the signals of 697 kHz, 770 kHz, 852 kHz, 941 kHz, 1,209 kHz, 1,336 kHz and 1,477 kHz, respectively.

Figure 8:
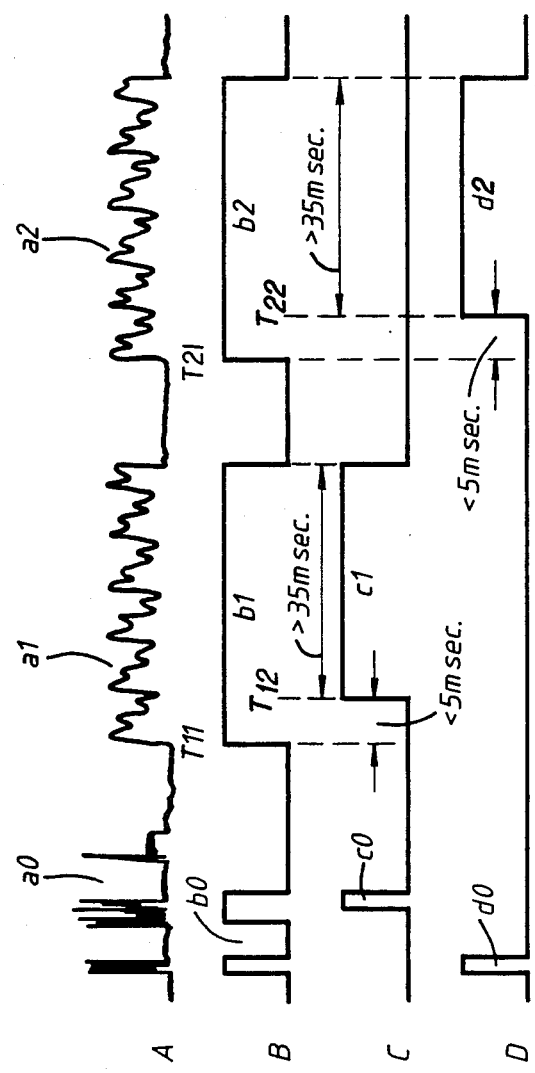
FIG. 8 is a timing diagram for illustrating operation of the DTMF signal discriminating circuit shown in FIG. 7.

Referring now to FIG. 8, the operation of the automatic telephone answering apparatus shown in FIG. 7, in particular the DTMF signal discriminating circuit 30, now will be described. FIG. 8 shows a time diagram for signals in the DTMF signal discriminating circuit 30. When a subscriber calls his or her automatic telephone answering apparatus from a remote telephone set (not shown) by dialing, the bell signal detection circuit 22 detects bell signals transmitted from the remote telephone set and applies a detection signal to the bell detection signal input terminal 36b of the microcomputer 36. The microcomputer 36 applies a prescribed control signal to the control terminal 24a of the line switch circuit 24 through the control signal output terminal 36a so as to activate the line switch circuit 24 in response to the bell detection signal. As a result, a communication channel is established between the remote telephone set and the automatic telephone answering apparatus. The microcomputer 36 also drives the OGM source 26 so that the OGM source 26 transmits the OGM signal prerecorded therein to the selective signal coupling circuit 32.

The OGM signal applied to the input terminal 32a is selectively supplied to the input/output terminal 32b through the resistor 50a. The OGM signal obtained on the input/output terminal 32b then is transmitted to the subscriber on the remote telephone set through the line coupling transformer 20 and the telephone line TL. The subscriber on the remote telephone set is able to recognize that the automatic telephone answering apparatus is ready to respond for remote-control operations from the remote telephone set, by hearing the OGM signal thus transmitted from the automatic telephone answering apparatus. The subscriber then is able to apply a prescribed DTMF signal to the automatic telephone answering apparatus by using the remote telephone set.

When the subscriber sequentially operates two telephone buttons, e.g., "1" and "3" for carrying out a prescribed remote control operation, first, the DTMF signal "1", composed of the 697 kHz low frequency signal and the 1,209 kHz high frequency signal, is generated from the telephone set. Next, the DTMF signal "3", composed of the 697 kHz low frequency signal and the 1,477 kHz high frequency signal, is generated from the telephone set. The low frequency signal and the high frequency signal in the same DTMF signal are generated within five (5) msec. of each other, as described before. Also, the overlap time of the low frequency signal and the high frequency signal in the same DTMF signal must last for at least thirty five (35) msec., as described before.

The DTMF signals "1" and "3" are applied to the input/output terminal 32b of the selective signal coupling circuit 32 through the telephone line TL and the line coupling transformer 20. In the selective signal coupling circuit 32, the DTMF signals "1" and "3" are selectively supplied to the output terminal 32c of the selective signal coupling circuit 32 with a sufficient level, as shown by a graph A in FIG. 8. In the graph A, waveforms a0, a1 and a2 denote undesired signals or noises received by the DTMF signal discriminating circuit 30, the DTMF signal "1" and the DTMF signal "3", respectively. The OGM signal generated from the OGM source 26 is, of course, an audio frequency band signal as described before. When the OGM signal applied to the selective signal coupling circuit 32 leaks out to the output terminal 32c at a sufficient level, the leaking OGM signal is received at the input terminal of the frequency signal extracting circuit 34 as a noise signal a0.

These signals a0, a1 and a2 are then applied to the frequency signal extracting circuit 34. In the frequency signal extracting circuit 34, the 697 kHz signal component in the noise signal a0, i.e., the OGM signal, and in the DTMF signals a1 and a2, i.e., "1" and "3", is extracted through the BPF circuit 38a. The 697 kHz signal component is then rectified in the rectifier circuit 70a so that rectified signals b0, b1 and b2, which correspond to the OGM signal and the DTMF signals "1" and "3" are obtained, as shown in the graph B. The 1,209 kHz signal component in the noise signal a0, i.e., the OGM signal, and in the DTMF signal a1, i.e., "1" is extracted through the BPF circuit 38e. The 1,209 kHz signal component is then rectified in the rectifier circuit 70e so that rectified signals c0 and c1, which correspond to the OGM signal and the DTMF signal "1" are obtained, as shown in the graph C. The 1,477 kHz signal component in the OGM signal a0, and in the DTMF signal a2, i.e., the DTMF signal "3", is also extracted through the BPF circuit 38g. The 1,477 kHz signal component is then rectified in the rectifier circuit 70g so that rectified signals d0 and d2, which correspond to the OGM signal and the DTMF signal "3" are obtained, as shown in the graph D.

The rectified signals b0, c0 and d0 corresponding to the noise signal a0, i.e., the OGM signal, generally last for a relatively short period. However, the DTMF signals are so provided that they overlap for more than about thirty five (35) msec. for the microcomputer 36 to be capable of discriminating the DTMF signals. Thus, the rectified signals b1, b2, c1 and d2 corresponding to the DTMF signals "1" and "3" last for a relatively long period, at least thirty five (35) msec. The rectified signals b1 and b2 arise at the times T11 and T21, respectively. The DTMF signals are so provided that the low frequency signal and the high frequency signal in the same DTMF signal should be generated within a time difference of five (5) msec. of each other when a prescribed button is operated, as described before. Thus, the rectified signal c1 arises at the time T12 within five msec. from the time T11. Also, the rectified signal d2 arises at the time T22 within five msec. from the time T21.

The outputs b0, b1, b2, c0, c1, d0 and d2 of the rectifier circuits 70a, 70e and 70g are applied to the input terminals 36-Ia, 36-Ie and 36-Ig of the microcomputer 36. The microcomputer 36 itself is equipped with a timer clock (not shown). The microcomputer 36 starts the clock when two rectified signals of a low frequency signal and a high frequency signal are applied within a time difference of less than the five msec. The microcomputer 36 judges that the two signals are of a prescribed DTMF signal, when the rectified signals remain at the H level for more than thirty five (35) msec. at the same time. Therefore, the microcomputer 36 discriminates the DTMF signals "1" and "3" by judging that the rectified signals b1 and c1 applied from the rectifier circuits 70a and 70e last for at least thirty five (35) msec. together and that the rectified signals b2 and d2 applied from the rectifier circuits 70a and 70g also last for at least thirty five (35) msec. at the same time. The microcomputer 36 is prevented from discriminating the rectified signals b0, c0 and d0 as with a DTMF signal due to the fact that the two rectified signals b0 and c0 or b0 and d0 do not overlap for the long period of more than thirty five (35) msec., even if the two signals arise at the same time. As a result, the microcomputer 36 is able to discriminate only the DTMF signals without error caused by noise signals.

Figure 9:
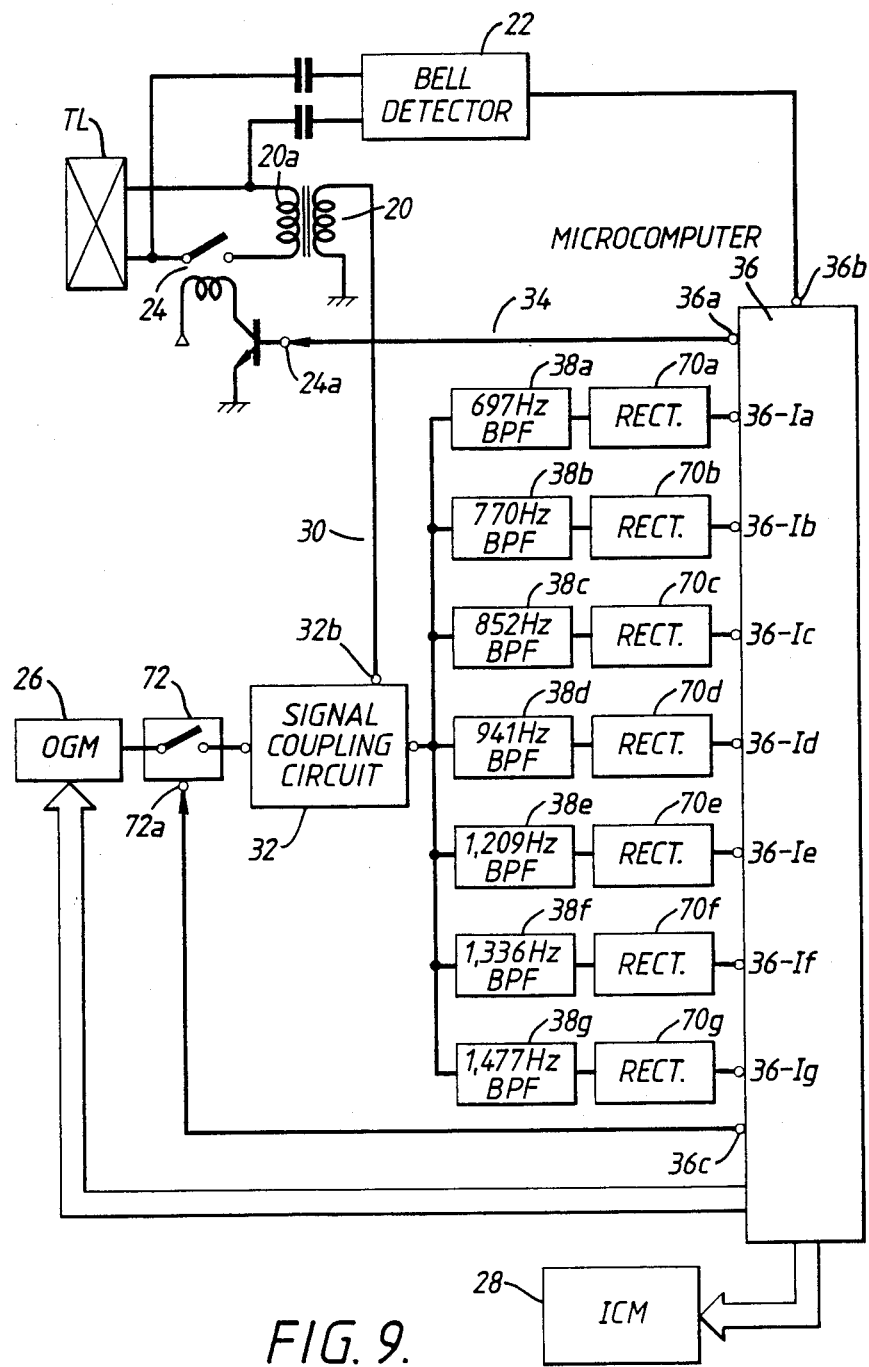
FIG. 9 is a block diagram showing an automatic telephone answering apparatus which is equipped with a third embodiment of the DTMF signal discriminating circuit according to the present invention.

Referring now to FIG. 9, an automatic telephone answering apparatus, which is equipped with a third embodiment of the DTMF signal discriminating circuit according to the present invention, will be described. In FIG. 9, the automatic telephone answering apparatus is comprised of a line coupling transformer 20, a bell signal detection circuit 22, a line switch circuit 24, an OGM source 26 such as a magnetic tape apparatus, an OGM muting switch 72, an ICM recorder 28 such as a magnetic tape recorder and a DTMF signal discriminating circuit 30 for discriminating the DTMF signals. The DTMF signal discriminating circuit 30 comprises a selective signal coupling circuit 32, a frequency signal extracting circuit 34 and a microcomputer 36. The third embodiment of the automatic telephone answering apparatus is different from the two prior embodiments in that the third embodiment has the OGM muting switch 72 between the OGM source 26 and the DTMF signal discriminating circuit 30. The OGM muting switch 72 has a control terminal 72a which is connected to a second control signal output terminal 36c of the microcomputer 36.

The line coupling transformer 20 is provided for being coupled to a telephone line TL through the line switch circuit 24. The line switch circuit 24 has a control terminal 24a connected to a first control signal output terminal 36a of the microcomputer 36. The bell signal detection circuit 22 is coupled between the primary winding 20a of the line coupling transformer 20 and a bell detection signal input terminal 36b of the microcomputer 36 for detecting a bell signal applied through the telephone line TL so that the microcomputer 36 activates the line switch circuit 24 in response to a detection signal from the bell signal detection circuit 22. The OGM source 26 and the ICM recorder 28 are arranged so that the OGM source 26 generates an OGM signal and the ICM recorder 28 records an ICM signal applied through the telephone line TL and the line coupling transformer 20 under the control of the microcomputer 36 in a prescribed automatic telephone answering mode, similar to the above two embodiments.

The frequency signal extracting circuit 34 is comprised of first to seventh BPF circuits 38a, 38b, 38c, . . . 38g and also first to seventh rectifier circuits 70a, 70b, 70c, . . . 70g. The first to seventh BPF circuits 38a, 38b, 38c, . . . 38g are connected in parallel between the selective signal coupling circuit 32 and the microcomputer 26. That is, the input terminals of the first to seventh BPF circuits 38a, 38b, 38c, . . . 38g are connected in common to the output terminal 32c of the selective signal coupling circuit 32, while the output terminals of the first to seventh BPF circuits 38a, 38b, 38c, . . . 38g are connected in parallel to first to seventh input terminals 36-Ia, 36-Ib, 36-Ic, . . . 36-Ig of the microcomputer 36. The first to seventh rectifier circuits 70a, 70b, 70c, . . . 70g are connected in parallel between the first to seventh BPF circuits 38a, 38b, 38c, . . . 38g and the input terminals 36-Ia, 36-Ib, 36-Ic, . . . 36-Ig of the microcomputer 36, respectively. The first to seventh BPF circuits 38a, 38b, 38c, . . . 38g and the first to seventh rectifier circuits 70a, 70b, 70c, . . . 70g are responsive to the frequency signals, i.e., the signals of 697 kHz, 770 kHz, 852 kHz, 941 kHz, 1,209 kHz, 1,336 kHz and 1,477 kHz, respectively.

Figure 10:
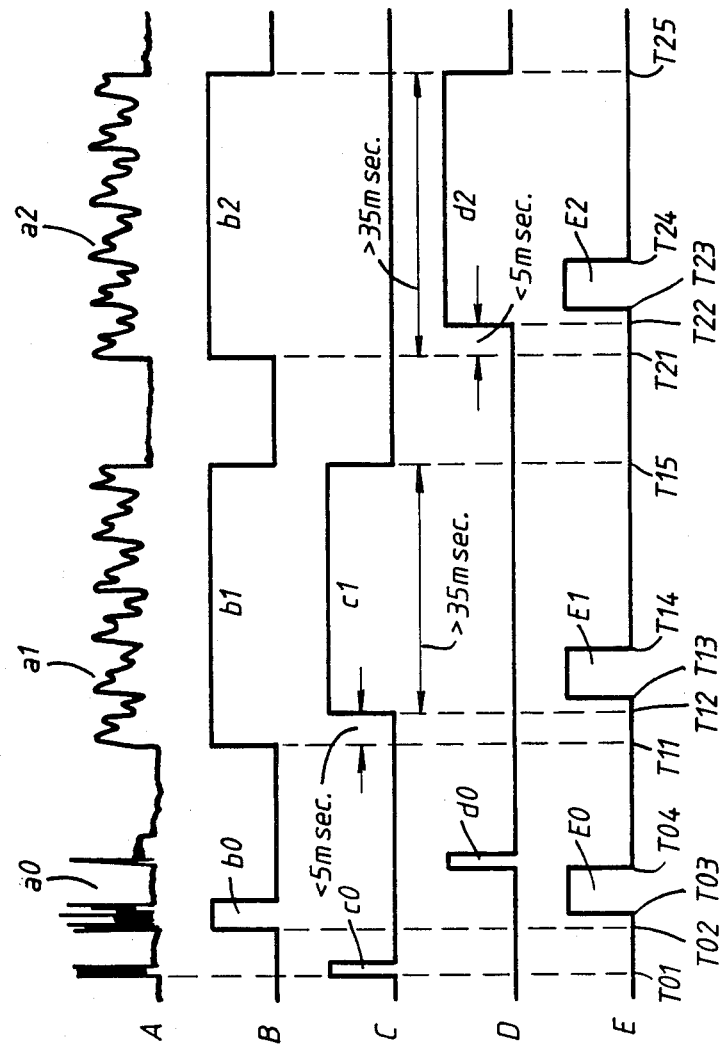
FIG. 10 is a timing diagram for illustrating operation of the DTMF signal discriminating circuit shown in FIG. 9.

Referring now to FIG. 10, the operation of the automatic telephone answering apparatus shown in FIG. 9, in particular the DTMF signal discriminating circuit 30, will be described. FIG. 10 shows a time diagram for signals in the DTMF signal discriminating circuit 30. When a subscriber calls his or her automatic telephone answering apparatus from a remote telephone set (not shown) by dialing, the bell signal detection circuit 22 detects bell signals transmitted from the remote telephone set and applies a detection signal to the bell detection signal input terminal 36b of the microcomputer 36. The microcomputer 36 applies a prescribed control signal to the control terminal 24a of the line switch circuit 24 through the first control signal output terminal 36a so as to activate the line switch circuit 24 in response to the bell detection signal. As a result, a communication channel is established between the remote telephone set and the automatic telephone answering apparatus. The microcomputer 36 also drives the OGM source 26 so that the OGM source 26 transmits the OGM signal prerecorded therein to the selective signal coupling circuit 32.

The OGM signal applied to the input terminal 32a is selectively supplied to the input/output terminal 32b of the selective signal coupling circuit 32. The OGM signal obtained on the input/output terminal 32b then is transmitted to the subscriber on the remote telephone set through the line couling transformer 20 and the telephone line TL. The subscriber on the remote telephone set is able to recognize that the automatic telephone answering apparatus is ready to respond for remote control operations from the remote telephone set, by hearing the OGM signal thus transmitted from the automatic telephone answering apparatus. The subscriber then is able to apply a prescribed DTMF signal to the automatic telephone answering apparatus by using the remote telephone set.

When the subscriber sequentially operates two telephone buttons, e.g., "1" and "3" for carrying out a prescribed remote control, first, the DTMF signal "1", composed of the 697 kHz low frequency signal and the 1,209 kHz high frequency signal, is generated from the telephone set. Next, the DTMF signal "3" composed of the 697 kHz low frequency signal and the 1,477 kHz high frequency signal is generated from the telephone set. The low frequency signal and the high frequency signal in the same DTMF signal are timed so that they are generated within five (5) msec. from each other, as described before. Also, the low frequency signal and the high frequency signal in the same DTMF signal overlap for at least thirty five (35) msec., as described before.

The DTMF signals "1" and "3" are applied to the input/output terminal 32b of the selective signal coupling circuit 32 through the telephone line TL and the line coupling transformer 20. In the selective signal coupling circuit 32, the DTMF signals "1" and "3" are selectively supplied to the output terminal 32c of the selective signal coupling circuit 32 at a sufficient level, as shown in graph A of FIG. 10. In the graph A, waveforms a0, a1 and a2 denote undesired signals or noises received by the DTMF signal discriminating circuit 30, the DTMF signal "1" and the DTMF signal "3", respectively. The OGM signal generated from the OGM source 26 is, of course, an audio frequency band signal, as described before. When the OGM signal applied to the selective signal coupling circuit 32 leaks out to the output terminal 32c at a sufficient level, the leaking OGM signal is received on the input terminal of the frequency signal extracting circuit 34 as a noise signal a0.

These signals a0, a1 and a2 are then applied to the frequency signal extracting circuit 34. In the frequency signal extracting circuit 34, the 697 kHz signal component in the noise signal a0, i.e., the OGM signal, and in the signals a1 and a2, i.e., the DTMF signals "1" and "3", is extracted through the BPF circuit 38a. The 697 kHz signal component is then rectified in the rectifier circuit 70a so that rectified signals b0, b1 and b2, which correspond to the OGM signal and the DTMF signals "1" and "3" are obtained, as shown in the graph B. The 1,209 kHz signal component in the noise signal a0, i.e., the OGM signal, and in the DTMF signal a1, i.e., the DTMF signal "1", is extracted through the BPF circuit 38e. The 1,209 kHz signal component is then rectified in the rectifier circuit 70e so that rectified signals c0 and c1, which correspond to the the OGM signal and the DTMF signal "1" are obtained, as shown in the graph C. The 1,477 kHz signal component in the OGM signal a0, and in the DTMF signal a2, i.e., the DTMF signal "3", is also extracted through the BPF circuit 38g. The 1,477 kHz signal component is then rectified in the rectifier circuit 70g so that rectified signals d0 and d2, which correspond to the OGM signal and the DTMF signal "3" are obtained, as shown in the graph D.

The rectified signals b0, c0 and d0 corresponding to the noise signal a0, i.e., the OGM signal, generally overlap for a relatively short period. However, the DTMF signals are so provided that they last for more than about thirty five (35) msec. for the microcomputer 36 to be capable of discriminating the DTMF signals. Thus, the rectifier signals b1, b2, c1 and d2 corresponding to the DTMF signals "1" and "3" last for a relatively long period, at least thirty five (35) msec. The rectified signals b1 and b2 arise at the times T11 and T21, respectively. The DTMF signals are so provided that the low frequency signal and the high frequency signal in the same DTMF signal should be generated within five (5) msec. of each other when a prescribed button is operated, as described before. Thus, the rectified signals c1 arises at time T12 within five msec. from the time T11. Also, the rectified signals d2 arises at the time T22 within five msec. from the time T21.

The outputs b0, b1, b2, c0, c1, d0 and d2 of the rectifier circuits 70a, 70e and 70g are applied to the input terminals 36-Ia, 36-Ie and 36-Ig of the microcomputer 36. The microcomputer 36 itself is equipped with a timer clock (not shown). The microcomputer 36 starts the clock when the microcomputer 36 has received any one of the rectified signals (referred to as the first rectified signal hereafter). The microcomputer 36 then examines whether the other rectified signal (referred as second rectified signal hereafter) of a different frequency range is applied thereto within a time lag less than a first standard examination period, e.g., about five msec. from the occurrence of the first rectified signal. That is, when the first rectified signal has been applied to one of the input terminals 36-Ia, 36-Ib, 36-Ic, . . . 36-Ig of the microcomputer 36, the microcomputer 36 examines whether the second rectified signal is applied to one of the input terminals 36-Ia, 36-Ib, 36-Ic, . . . 36-Ig within the first standard examination period. The microcomputer 36 further examines whether a level difference between the first and second rectified signals is in a standard level range, e.g., about three (3) dB. The microcomputer 36 outputs a muting signal from the microcomputer 36c and supplies it to the control terminal 72a of the OGM muting switch 72, when the time lag and the level difference between the first and second rectified signals fall within the standard examination period and level range, respectively. On the other hand, the microcomputer 36 resets the timer clock until any other rectified signal is applied to the microcomputer 36, when the time lag or the level range between the first and second signals is out of the standard period or level range. The OGM muting switch 72 disconnects the OGM source 26 from the DTMF signal discriminating circuit 30 in response to the muting signal applied to the control terminal 72a. The muting signal is applied for a standard muting period, e.g., about five (5) msec. The microcomputer 36 still maintains its examinations of the first and second rectified signals during the standard muting period. If the first or second rectified signal has disappeared within the standard muting period, the microcomputer 36 judges that the first and second rectified signals originated from the OGM signal. The microcomputer 36 also continues the examination for a second standard examination period, e.g., about thirty five msec. from the occurrence of the second rectified signal. The microcomputer 36 then judges whether the first and second rectified signals originated from the DTMF signals, if the first and second rectified signals are successively applied to the microcomputer 36 during the second standard examination period. As a result, the DTMF signal discriminating circuit 30 accurately judges whether the first and second rectified signals are originated from a noise signal, such as the OGM signal, or from the DTMF signals.

Referring now to FIG. 10, some examples of the examination operation of the microcomputer 36 will be described in regard to the discrimination of the DTMF signals "1" and "3". When the rectified signal c0 corresponding to the 1,209 kHz signal in the leaking OGM signals a0, as shown by the graph C in FIG. 10, is first applied to the input terminal 36-Ie of the microcomputer 36 as the first rectified signal at a time T01, the microcomputer 36 starts the timer clock. The microcomputer 36 generates a first muting signal E0, when another rectified signal b0 corresponding to the 697 kHz signal in the leaking OGM signals a0, as shown by the graph B in FIG. 10, is applied to the input terminal 36-Ia of the microcomputer 36 as the second rectified signal at a time T02 within the first examination period following the time T01. The first muting signal E0 is applied to the control terminal 72a of the OGM muting switch 72 so that the OGM source 26 is disconnected from the DTMF signal discriminating circuit 30 during the muting period, e.g., from a time T03 to a time T04. The first and second rectified signals c0 and b0 are prevented from being applied to the microcomputer 36 for the muting period. Thus, the microcomputer 36 judges that the rectified signals c0 and b0 did not originate from the DTMF signals. As a result, the microcomputer 36 resets the timer clock and stops the examination for the rectified signals c0 and b0.

Next, the rectified signal b1 corresponding to the 697 kHz signal in the DTMF signal a1 of the DTMF signal "1", as shown by the graph B in FIG. 10, is applied to the input terminal 36-Ia of the microcomputer 36 as the first rectified signal at a time T11, and the microcomputer 36 again starts the timer clock. The microcomputer 36 generates a second muting signal E1, when another rectified signal c1 corresponding to the 1,209 kHz signal in the same DTMF signal "1", as shown by the graph C in FIG. 10, is applied to the input terminal 36-Ie of the microcomputer 36 as the second rectified signal at a time T12 within the first examination period after the time T11. The second muting signal E1 is also applied to the control terminal 72a of the OGM muting switch 72 so that the OGM source 26 is disconnected from the DTMF signal discriminating circuit 30 during the muting period, e.g., from a time T13 to a time T14. However, the first and second rectified signals b1 and c1 are successively applied to the microcomputer 36 for the muting period, in spite of the muting operation. The microcomputer 36 then continues the examination for the first and second rectified signals b1 and c1 during the second standard examination period from the occurrence of the second rectified signal, i.e., until a time T15. If the first and second rectified signals b1 and c1 are applied to the microcomputer 36 without interruption, during the second standard examination period, the microcomputer 36 judges that the first and second rectified signals b1 and c1 originated from the DTMF signal "1". The timer clock is then reset after when both the first and second rectified signals b1 and c1 have stopped.

Next, the rectified signal b2 corresponding to the 697 kHz signal in the DTMF signal a2 or the DTMF signal "3", as shown by the graph B in FIG. 10, is applied to the input terminal 36-Ia of the microcomputer 36 as the first rectified signal at a time T21, and the microcomputer 36 again starts the timer clock. The microcomputer 36 generates a third muting signal E2, when another rectified signal d2 corresponding to the 1,477 kHz signal in the same DTMF signal "3", as shown by the graph D in FIG. 10, is applied to the input terminal 36-Ig of the microcomputer 36 as the second rectified signal at a time T22 within the first examination period from the time T21. The third muting signal E2 is also applied to the control terminal 72a of the OGM muting switch 72 so that the OGM source 26 is disconnnected from the DTMF signal discriminating circuit 30 during the muting period, e.g., from a time T23 to a time T24. However, the first and second rectified signals b2 and d2 are successively applied to the microcomputer 36 for the muting period, in spite of the muting operation. The microcomputer 36 then continues the examination for the first and second rectified signals b2 and d2 during the second standard examination period after the occurrence of the second rectified signal d2, i.e., until a time T25. If the first and second rectified signals b2 and d2 are applied to the microcomputer 36 without interruption during the second standard examination period, the microcomputer 36 judges that the first and second rectified signals b2 and d2 originated from the DTMF signal "3".

Figure 11:
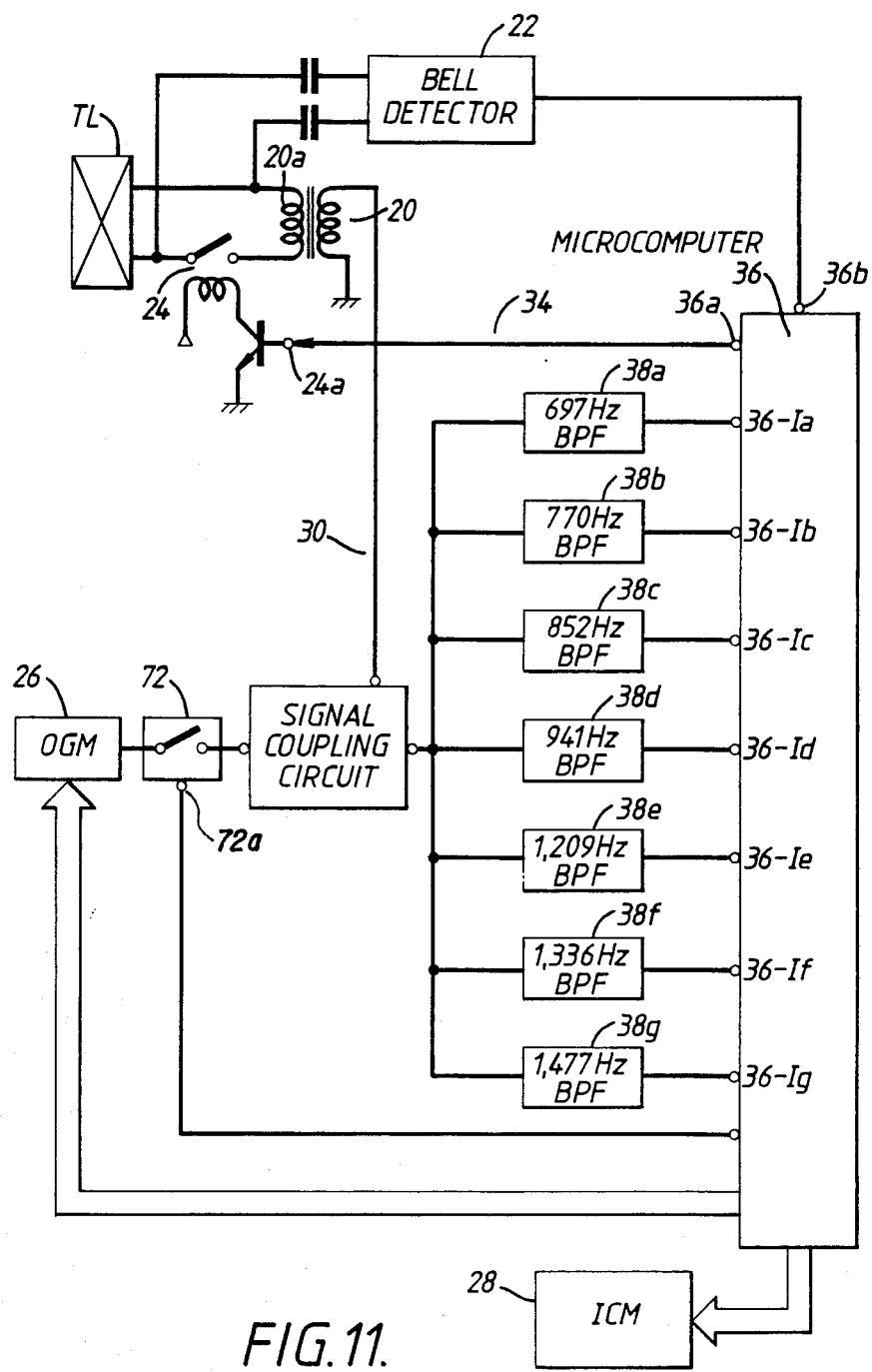
FIG. 11 is a block diagram showing an automatic telephone answering apparatus which is equipped with a modification of the third embodiment of the DTMF signal discriminating circuit according to the present invention.

Referring now to FIG. 11, an automatic telephone answering apparatus, which is equipped with a modified example of the third embodiment of the DTMF signal discriminating circuit according to the present invention, will be described. In FIG. 11, the automatic telephone answering apparatus is comprised of a line coupling transformer 20, a bell signal detection circuit 22, a line switch circuit 24, an OGM source 26 such as a magnetic tape apparatus, an OGM muting switch 72, an ICM recorder 28 and a DTMF signal discriminating circuit 30 for discriminating the DTMF signals. The DTMF signal discriminating circuit 30 comprises a selective signal coupling circuit 32, a frequency signal extracting circuit 34 and a microcomputer 36. The modified embodiment of the automatic telephone answering apparatus is different from the third embodiment in that the frequency signal extracting circuit 34 is constructed with only the first to seventh BPF circuits 38a, 38b, 38c, ... 38g, i.e., without the first to seventh rectifier circuits 70a, 70b, 70c, ... 70g.

The OGM muting switch 72 has a control terminal 72a which is connected to a second control signal output terminal 36c of the microcomputer 36. The line coupling transformer 20 is coupled to a telephone line TL through the line switch circuit 24. The line switch circuit 24 has a control terminal 24a connected to a first control signal output terminal 36a of the microcomputer 36. The bell signal detection circuit 22 is coupled between the primary winding 20a of the line coupling transformer 20 and a bell detection signal input terminal 36b of the microcomputer 36 for detecting a bell signal applied through the telephone line TL. Thus, the microcomputer 36 activates the line switch circuit 24 in response to a detection signal from the bell signal detection circuit 22. The OGM source 26 and the ICM recorder 28 are arranged so that the OGM source 26 generates an OGM signal and the ICM recorder 28 records an ICM signal applied through the telephone line TL and the line coupling transformer 20 under the control of the microcomputer 36 in a prescribed automatic telephone answering mode, similar to the above two embodiments.

The frequency signal extracting circuit 34 is comprised of first to seventh BPF circuits 38a, 38b, 38c, ...

38g. The first to seventh BPF circuits 38a, 38b, 38c, . . . 38g are connected in parallel between the selective signal coupling circuit 32 and the microcomputer 36. That is, the input terminals of the first to seventh BPF circuits 38a, 38b, 38c, . . . 38g are connected in common to the output terminal 32c of the selective signal coupling circuit 32, while the output terminals of the first to seventh BPF circuits 38a, 38b, 38c, . . . 38g are connected in parallel to first to seventh input terminals 36-Ia, 36-Ia-b, 36-Ic, . . . 36-Ig of the microcomputer 36. The first to seventh BPF circuits 38a, 38b, 38c, . . . 38g are responsive to the frequency signals, i.e., the signals of 697 kHz, 770 kHz, 852 kHz, 941 kHz, 1,209 kHz, 1,336 kHz and 1,477 kHz, respectively.

Figure 12:
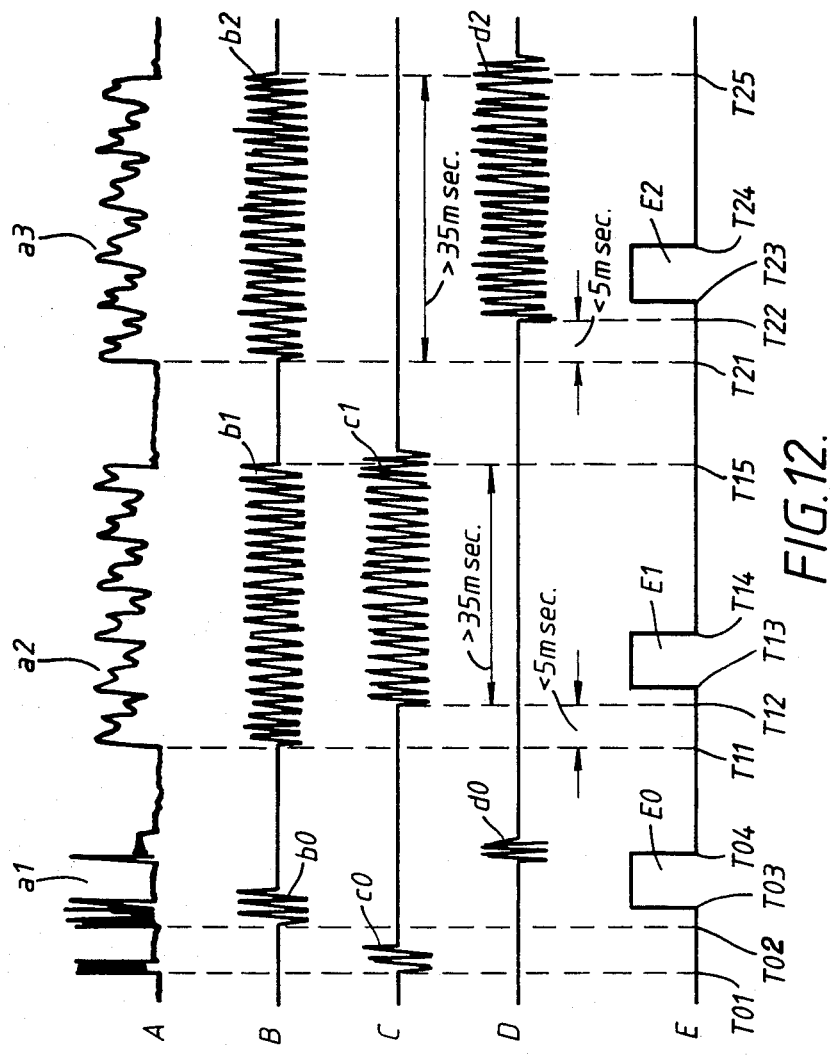
FIG. 12 is a timing diagram for illustrating operation of the DTMF signal discriminating circuit shown in FIG. 11.

Referring now to FIG. 12, the operation of the automatic telephone answering apparatus shown in FIG. 11, and in particular the DTMF signal discriminating circuit 30, will be described. FIG. 12 shows a time diagram for signals in the DTMF signal discriminating circuit 30. When a subscriber calls his or her automatic telephone answering apparatus from a remote telephone set (not shown) by dialing, the bell signal detection circuit 22 detects bell signals transmitted from the remote telephone set and applies a detection signal to the bell detection signal input terminal 36b of the microcomputer 36. The microcomputer 36 applies a prescribed control signal to the control terminal 24a of the line switch circuit 24 through the first control signal output terminal 36a so as to activate the line switch circuit 24 in response to the bell detection signal. As a result, a communication channel is established between the remote telephone set and the automatic telephone answering apparatus. The microcomputer 36 also drives the OGM source 26 so that the OGM source 26 transmits the OGM signal prerecorded therein to the selective signal coupling circuit 32.

The OGM signal applied to the input terminal 32a is selectively supplied to the input/output terminal 32b of the selective signal coupling circuit 32. The OGM signal obtained on the input/output terminal 32b then is transmitted to the subscriber on the remote telephone set through the line coupling transformer 20 and the telephone line TL. The subscriber on the remote telephone set is able to recognize that the automatic telephone answering apparatus is ready to respond for remote control operations from the remote telephone set, by hearing the OGM signal thus transmitted from the automatic telephone answering apparatus. The subscriber then is able to apply a prescribed DTMF signal to the automatic telephone answering apparatus by using the remote telephone set.

When the subscriber sequentially operates two telephone buttons, e.g., "1" and "3" for carrying out a prescribed remote control, first, the DTMF signal "1", composed of the 697 kHz low frequency signal and the 1,209 kHz high frequency signal, is generated from the telephone set. Next, the DTMF signal "3" composed of the 697 kHz low frequency signal and the 1,477 kHz high frequency signal is generated from the telephone set. The low frequency signal and the high frequency signal in the same DTMF signal are timed so that they are generated within five (5) msec. from each other, as described before. Also, the low frequency signal and the high frequency signal in the same DTMF signal overlap for at least thirty five (35) msec., as described before.

The DTMF signals "1" and "3" are applied to the input/output terminal 32b of the selective signal coupling circuit 32 through the telephone line TL and the line coupling transformer 20. In the selective signal coupling circuit 32, the DTMF signals "1" and "3" are selectively supplied to the output terminal 32c of the selective signal coupling circuit 32 at a sufficient level, as shown in graph A of FIG. 12. In the graph A, waveforms a0, a1 and a2 denote undesired signals or noises received by the DTMF signal discriminating circuit 30, the DTMF signal "1" and the DTMF signal "3", respectively. The OGM signal generated from the OGM source 26 is, of course, an audio frequency band signal, as decribed before. When the OGM signal applied to the selective signal coupling circuit 32 leaks out to the output terminal 32c at a sufficient level, the leaking OGM signal is received on the input terminal of the frequency signal extracting circuit 34 as a noise signal a0.

These signals a0, a1 and a2 are then applied to the frequency signal extracting circuit 34. In the frequency signal extracting circuit 34, the 697 kHz signal component in the noise signal a0, i.e., the OGM signal, and in the signals a1 and a2, i.e., the DTMF signals "1" and "3", is extracted through the BPF circuit 38a. The 697 kHz signals b0, b1 and b2, as shown by the graph B in FIG. 12, are then supplied to the input terminal 36-Ia of the microcomputer 36, in correspondence with the OGM signal a0 and the DTMF signals a1 and a2, i.e., the DTMF signals "1" and "3". The 1,209 kHz signal component in the noise signal a0, i.e., the DTMF signal the OGM signal and the DTMF signal a1, i.e., "1" is extracted through the BPF circuit 38e. The 1,209 kHz signals c0 and c1, which correspond to the OGM signal a0, and in the DTMF signal a1, i.e., the DTMF signal "1" as shown by the graph C in FIG. 12, are then supplied to the input terminal 36-Ie of the microcomputer 36. The 1,477 kHz signal component in the OGM signal a0 and the DTMF signal a2, i.e., the DTMF signal "3" is also extracted through the BPF circuit 38g. The 1,477 kHz signals d0 and d2, as shown by the graph D in FIG. 12, are then applied to the input terminal 36-Ig of the microcomputer 36, in correspondence to the OGM signal a0 and the DTMF signal a2, i.e., the DTMF signal "3".

The 697 kHz signal b0, the 1,209 kHz signal c0 and the 1,477 kHz signal d0 respectively corresponding to the noise signal a0, i.e., the OGM signal, generally last for a relatively short period. However, the DTMF signals are so provided that they overlap for more than about thirty five (35) msec. for the microcomputer 36 to be capable of discriminating the DTMF signals with a sufficient time. Thus, the 697 kHz signals b1 and b2, the 1,209 kHz signal c1 and the 1,477 kHz signal d2 corresponding to the DTMF signals "1" and "3" last for a relatively long period, at least thirty five (35) msec. The 697 kHz signals b1 and b2 arise at the times T11 and T21, respectively. The DTMF signals are so provided that the low frequency signal and the high frequency signal in the same DTMF signal should be generated within five (5) msec. of each other when a prescribed button is operated, as described before. Thus, the 1,209 kHz signal c1 arises at time T12 within five msec. from the time T11. Also, the signal d2 arises at the time T22 within five msec. from the time T21.

The outputs b0, b1, b2, c0, c1, d0 and d2 of the 38a, 38e and 38g are applied to the input terminal 36-Ia, 36-Ie and 36-Ig of the microcomputer 36. The microcomputer 36 itself is equipped with a timer clock (not shown). The microcomputer 36 starts the clock when the microcomputer 36 has received any one of the frequency signals (referred to as the first frequency signal hereafter). The microcomputer 36 then examines whether another frequency signal (referred to as the second frequency signal hereafter) of a different frequency range is applied thereto within a time lag of a first standard examination period, e.g., about five msec. from the occurrence of the first frequency signal. That is, when the first frequency signal has been applied to one of the input terminals 36-Ia, 36-Ib, 36-Ic and 36-Id of the microcomputer 36, the microcomputer 36 examines whether the second frequency signal is supplied to one of the input terminal 36-Ie, 36-If and 36-Ig within the first standard examination period. The microcomputer 36 further examines whether an amplitude difference between the first and second frequency signals is in a standard amplitude range, e.g., about three (3) dB. The microcomputer 36 outputs a muting signal from the microcomputer 36c and supplies it to the control terminal 72a of the OGM muting switch 72, when the time lag and the level difference between the first and second frequency signals fall within the standard examination period and amplitude level range, respectively. The microcomputer 36 resets the timer clock until any other frequency signal is applied to the microcomputer 36, when the time lag or the level range between the first and second signals is out of the standard period or range. The OGM muting switch 72 disconnects the OGM source 26 from the DTMF signal discriminating circuit 30 in response to the muting signal applied to the control terminal 72a. The muting signal is applied for a standard muting period, e.g., about five (5) msec. The microcomputer 36 still maintains its examinations of the first and second frequency signals during the standard muting period. If the first or second frequency signal has disappeared within the standard muting period, the microcomputer 36 judges that the first and second frequency signals originated from the OGM signal. The microcomputer 36 also continues the examination for a second standard examination period, e.g., about thirty five msec. from the occurrence of the second frequency signal. The microcomputer 36 then judges whether the first and second frequency signals are originated from the DTMF signals, if the first and second frequency signals are successively applied to the microcomputer 36 during the second standard examination period. As a result, the DTMF signal discriminating circuit 30 accurately judges whether the first and second frequency signals are originated from a noise signal, such as the OGM signal, or from the DTMF signal.

Referring now to FIG. 12, some examples of the examination operation of the microcomputer 36 will be described in regard to the discrimination of the DTMF signals "1" and "3". When the frequency signal c0 corresponding to the 1,209 kHz signal in the leaking OGM signals a0, as shown by the graph C in FIG. 12, is first applied to the input terminal 36-Ie of the microcomputer 36 as the first frequency signal at a time T01, the microcomputer 36 starts the timer clock. The microcomputer 36 generates a first muting signal E0, when another frequency signal b0 corresponding to the 697 kHz signal in the leaking OGM signals a0, as shown by the graph B in FIG. 12, is applied to the input terminal 36-Ia of the microcomputer 36 as the second frequency signal at a time T02 within the first examination period following the time T01. The first muting signal E0 is applied to the control terminal 72a of the OGM muting switch 72 so that the OGM source 26 is disconnected from the DTMF signal discriminating circuit 30 during the muting period, e.g., from a time T03 to a time T04. The first and second frequency signals c0 and b0 are prevented from being applied to the microcomputer 36 for the muting period. Thus, the microcomputer 36 judges that the frequency signals c0 and b0 did not originate from the DTMF signals. As a result, the microcomputer 36 resets the timer clock and stops the examination for the frequency signals c0 and b0.

Next, the rectified signal b1 corresponding to the 697 kHz signal in the DTMF signal a1 of the DTMF signal "1", as shown by the graph B in FIG. 12, is applied to the input terminal 36-Ia of the microcomputer 36 as the first frequency signal at a time T11, and the microcomputer 36 again starts the timer clock. The microcomputer 36 generates a second muting signal E1, when another frequency signal c1 corresponding to the 1,209 kHz signal in the same DTMF signal "1", as shown by the graph C in FIG. 12, is applied to the input terminal 36-Ie of the microcomputer 36 as the second frequency signal at a time T12 within the first examination period after the time T11. The second muting signal E1 is also applied to the control terminal 72a of the OGM muting switch 72 so that the OGM source 26 is disconnected from the DTMF signal discriminating circuit 30 during the muting period, e.g., from a time T13 to a time T14. However, the first and second frequency signals b1 and c1 are successively applied to the microcomputer 36 for the muting period, in spite of the muting operation. The microcomputer 36 then continues the examination for the first and second frequency signals b1 and c1 during the second standard examination period from the occurrence of the second frequency signal, i.e., until a time T15. If the first and second frequency signals b1 and c1 are applied to the microcomputer 36 without interruption, during the second standard examination period, the microcomputer 36 judges that the first and second frequency signals b1 and c1 originated from the DTMF signal "1". The timer clock is then reset after both the first and second frequency signals b1 and c1 have stopped.

Next, the frequency signal b2 corresponding to the 697 kHz signal in the DTMF signal a2 or the DTMF signal "3", as shown by the graph B in FIG. 12, is applied to the input terminal 36-Ia of the microcomputer 36 as the first frequency signal at a time T21, and the microcomputer 36 again starts the timer clock. The microcomputer 36 generates a third muting signal E2, when another frequency signal d2 corresponding to the 1,477 kHz signal in the same DTMF signal "3", as shown by the graph D in FIG. 12, is applied to the input terminal 36-Ig of the microcomputer 36 as the second frequency signal at a time T22 within the first examination period from the time T21. The third muting signal E2 is also applied to the control terminal 72a of the OGM muting switch 72 so that the OGM source 26 is disconnected from the DTMF signal discriminating circuit 30 during the muting period, e.g., from a time T23 to a time T24. However, the first and second frequency signals b2 and d2 are successively applied to the microcomputer 36 for the muting period, in spite of the muting operation. The microcomputer 36 then continues the examination for the first and second frequency signals b2 and d2 during the second standard examination period after the occurrence of the second frequency signal d2, i.e., until a time T25. If the first and second frequency signals b2 and d2 are applied to the microcomputer 36 without interruption during the second standard examination period, the microcomputer 36 judges that the first and second frequency signals b2 and d2 are originated from the DTMF signal "3".

What is claimed is:

1. A DTMF signal discriminating circuit for discriminating DTMF signals corresponding to a plurality of predetermined operating modes of the apparatus, a remote control apparatus being connected to a remote source via a transmission line having a variable impedance and the apparatus including OGM signal generating means responsive to an input signal from the remote source for indicating that the apparatus can receive DTMF signals, comprising:

signal coupling means for selectively supplying the OGM signal to the remote source and for receiving the DTMF signals from the remote source, including circuit means for suppressing the OGM signal by compensating for variations in the variable impedance associated with receipt of a signal from said remote source, for substantially preventing operation of the apparatus in any of the predetermined operating modes in response to receipt of the OGM signal by the signal coupling means;

discrimination circuit means for receiving the DTMF signals from the signal coupling means and for extracting frequencies from the received signals; and microcomputer means responsive to the frequencies extracted by the discrimination circuit means for controlling operation of the apparatus in an operating mode corresponding to the received DTMF signals.

2. The circuit of claim 1 wherein the circuit means for suppressing the OGM signal includes a resistance bridge means and a differential amplifier means coupled to the resistance bridge means.

3. The circuit of claim 2 wherein the circuit means for suppressing the OGM signal also includes a variable impedance circuit means having a plurality of resistors connected in parallel to the microcomputer means, and a transistor means connected in series between the resistance bridge means and the plurality of resistors.

4. A DTMF signal discriminating circuit for discriminating DTMF signals corresponding to a plurality of predetermined operating modes of a remote control apparatus, the apparatus being connected to a remote source via a transmission line having a variable impedance and the apparatus including OGM signal generating means responsive to an input signal from the remote source for indicating that the apparatus can receive DTMF signals and discrimination circuit means, the OGM signal including components of specified frequencies, and the OGM signal also being received by the discrimination circuit means, comprising:

signal coupling means for selectively supplying the OGM signal to the remote source and for receiving the DTMF signals from the remote source, including circuit means for suppressing the OGM signal by compensating for variations in the variable impedance associated with receipt of a signal from said remote source, for substantially preventing operation of the apparatus in any of the predetermined operating modes in response to receipt of the OGM signal by the signal coupling means;

said discrimination circuit means responsive to the DTMF signals from the signal coupling eans for separating the DTMF signals into separate frequency components; and microcomputer means responsive to the components of the DTMF signals for controlling operation of the apparatus in an operating mode corresponding to the received components, including suppression means for suppressing the components of the OGM signal corresponding to the components of the received DTMF signals for substantially preventing operation of the apparatus in any of the predetermined modes in response to receipt of the OGM signal by the discrimination circuit means.

5. The circuit of claim 4 wherein the suppression means includes means for generating a control signal in response to receipt of the DTMF signal and for generating the control signal in response to receipt of OGM signal components by the microcomputer means; and switch means responsive to the generated control signal for muting receipt of the OGM signal by the signal coupling means.

6. A DTMF signal discriminating circuit for a remote control apparatus, the DTMF signals corresponding to a plurality of predetermined operating modes of the apparatus, the apparatus including OGM signal generating means responsive to an input signal from a remote source for indicating that the apparatus can receive DTMF signals and a discrimination circuit means, the OGM signal including components of specified frequencies, and the OGM signal also being received by the discrimination circuit means, comprising:

signal coupling means for selectively supplying the OGM signal to the remote source and for receiving the DTMF signals from the remote source, including circuit means for suppressing the OGM signal for substantially preventing operation of the apparatus in any of the predetermined operating modes in response to receipt of the OGM siganl by the signal coupling means;

said discrimination circuit means responsive to the DTMF signals from the signal coupling means for separating the DTMF signals into separate frequency components;

microcomputer means responsive to the components of the DTMF signals for controlling operation of the apparatus in an operating mode corresponding to the received components, including means for generating a control signal pulse in response to receipt of the DTMF signal and for generating the control signal pulse in response to receipt of OGM signal components by the microcomputer means; and switch means responsive to the control signal pulse for muting receipt of the OGM signal by the signal coupling means;

said microcomputer means being responsive to signal components only if said signal components are present when said switch means mutes receipt of the OGM signal and therefore, are determined by the microcomputer means to be the components of the DTMF signals.

* * * * *